Patented June 19, 1951

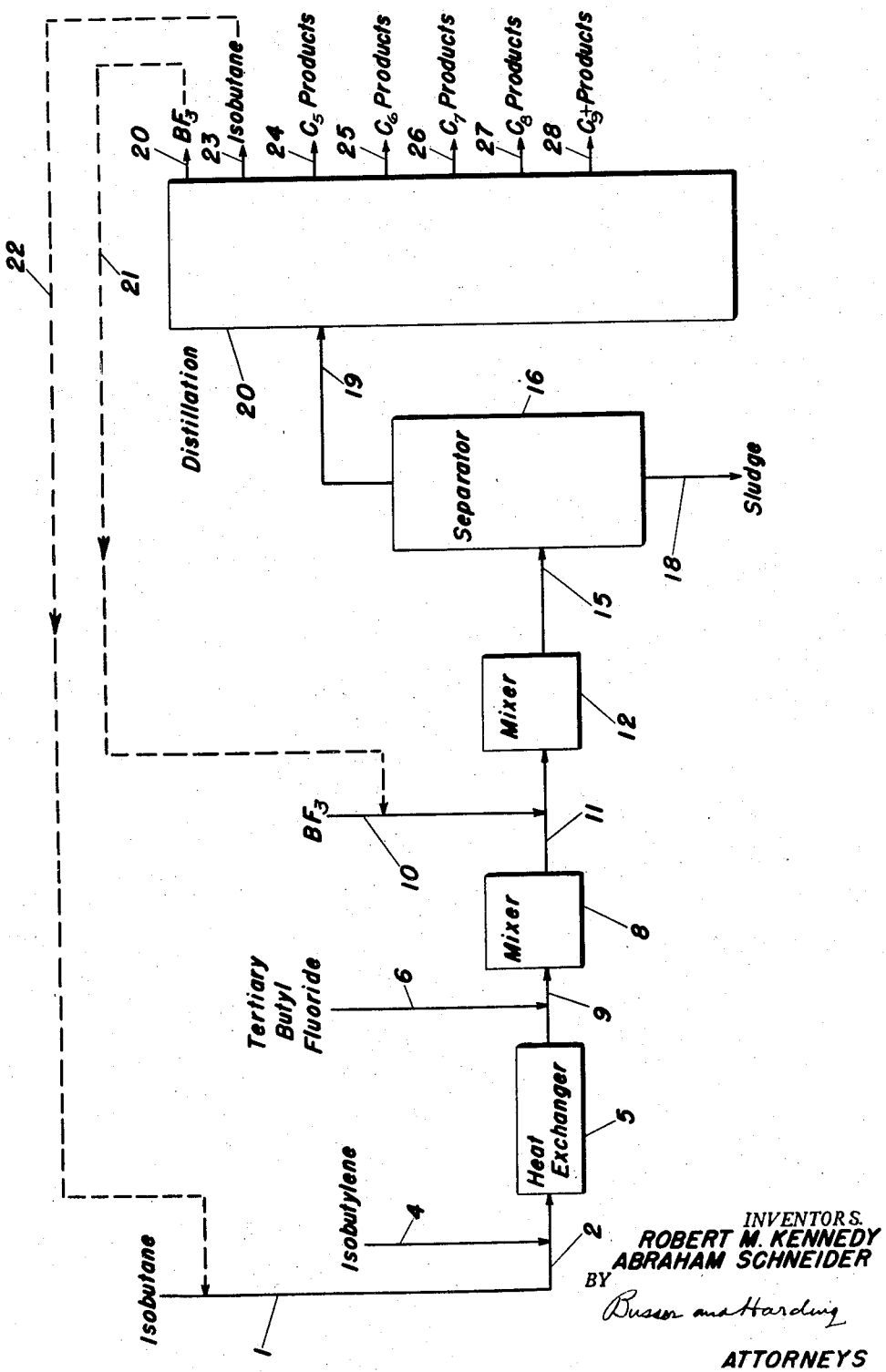

2,557,115

UNITED STATES PATENT OFFICE 2,557,115

PREPARATION OF 2,2,4-TRIMETHYLPENTANE

Robert M. Kennedy, Newtown Square, and Abraham Schneider, Philadelphia, Pa., assignors to Sun Oil Company, Philadelphia, Pa., a corporation of New Jersey Application April 9, 1949, Serial No. 86,526

10 Claims. (Cl. 260—683.4)

This invention relates to the preparation of 2,2,4-trimethylpentane by the alkylation of isobutane with isobutylene under novel catalytic conditions.

The preparation of 2,2,4-trimethylpentane by various alkylation processes, employing certain catalysts, is well known. 2,2,4-trimethylpentane is of importance in the preparation of high antiknock fuels for internal combustion engines, since it has a high octane rating, excellent rich mixture response, and suitable volatility characteristics.

The catalysts which have been proposed heretofore for carrying out the alkylation of isobutane and isobutylene include, e. g., sulfuric acid and anhydrous hydrofluoric acid at temperatures of from $-10°$ C. to $30°$ C.; as illustrative of other catalysts heretofore employed in alkylation reactions may be mentioned aluminum chloride with a promoter such as HCl, $BF_3$—$H_2O$—Ni complexes and $BF_3$—$H_2O$—HF complexes. These catalytic materials are insoluble in hydrocarbons, or at least are soluble only to a limited extent. When such catalysts are employed in conducting the reaction, it is therefore necessary to effect intimate contact between the hydrocarbon phase and the catalyst phase, and usually a mechanically agitated reactor is provided for continuously agitating the reactants and catalyst during the reaction period. This adds considerably to the expense of the operation with respect both to installation charges and operating costs.

It has now been discovered that by employing novel catalytic conditions, as hereinafter fully described, 2,2,4-trimethylpentane can be prepared in good yield by the alkylation of isobutane with isobutylene, the reaction being effected in homogeneous phase. The components constituting the catalyst are an alkyl fluoride and $BF_3$. Each of these are soluble in the reactants at least in the concentrations employed, so that the reaction does not depend upon contact between two separate phases.

The process of the present invention comprises bringing together an alkyl fluoride and $BF_3$ in the presence of isobutane and isobutylene at a suitable temperature whereby a catalytic condition becomes established which causes the alkylation to take place immediately. It appears that the catalytic effect is produced by the extraction of fluorine atoms from the alkyl fluoride by the $BF_3$, resulting in the formation of carbonium ions which initiate the alkylation reactions. As more fully described hereinafter, where the alkyl fluoride is a primary fluoride a temperature of at least $-10°$ C. is required to initiate this reaction. With secondary fluorides the reaction takes place to substantial extent down to temperatures as low as about $-90°$ C., while with tertiary fluorides the reaction begins to occur to substantial extent at temperatures as low as about $-120°$ C. In bringing together the alkyl fluoride and $BF_3$, the $BF_3$ can be introduced into a solution of the alkyl fluoride in the reactants, or both of the catalytic components can be introduced simultaneously but separately into the reactants. It is also permissible first to dissolve $BF_3$ in the isobutane and the alkyl fluoride in the isobutylene, and then bring together the separate solutions to effect reaction. It is not permissible, however, to premix the alkyl fluoride and $BF_3$ and then add the mixture to the hydrocarbons, for in such case the catalytic condition will be immediately spent when the alkyl fluoride and $BF_3$ are brought into contact with each other. Also, the mode of addition must be such as to avoid contact between isobutylene and $BF_3$ in the absence of the isobutane and alkyl fluoride, since the $BF_3$ will polymerize the isobutylene before the other components can be added. The best procedure is to admix the alkyl fluoride with a mixture of isobutane and isobutylene, and then contact the mixture with $BF_3$. The latter may be bubbled into the alkyl fluoride-hydrocarbon mixture, or the $BF_3$ may first be dissolved in isobutane and this solution mixed with the alkyl fluoride-hydrocarbon mixture. The constituents of the reaction and the components of the catalyst form a homogeneous phase, irrespective of their mode of addition, so that reaction does not depend upon contact between separate phases, and hence the mechanical agitation required to provide contact between separate phases is unnecessary.

The alkyl fluoride employed should have at least two carbon atoms per molecule. It may be a primary fluoride (i. e. one having the fluorine atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with $BF_3$ to promote the alkylation of isobutane and isobutylene to form 2,2,4-trimethylpentane.

The quantity of alkyl fluoride used in accordance with the present invention may be substantially varied and good results obtained. A low alkyl fluoride concentration, however, gives a relatively poor yield of 2,2,4-trimethylpentane, while a relatively high concentration tends to cause isomerization of the 2,2,4-trimethylpentane to other products containing less branching. Preferably, from 10 to 30 moles of the hydrocarbon reactants per mole of alkyl fluoride is employed. The amount of $BF_3$ to employ is not critical, only a very slight amount being sufficient to initiate the reaction. It is convenient to employ from about 0.05 to 5, preferably from 0.3 to 3, grams of $BF_3$ per mole of hydrocarbon mixture.

The temperature at which the present alkylation is obtained varies with the particular alkyl fluoride employed. We have found that when the fluoride is a tertiary fluoride, the reaction begins to occur to a substantial extent at temperatures in excess of $-120°$ C. When the alkyl fluoride is a secondary fluoride, the temperature should be in excess of $-90°$ C. At temperatures below this value, a secondary fluoride in combination with $BF_3$ has little catalytic effect. When the alkyl fluoride is a primary fluoride, the reaction temperature should be above $-10°$ C. in order to obtain substantial catalytic action. Ethyl fluoride, however, has been found to be somewhat more inert than the primary fluorides having three or more carbon atoms per molecule, and requires a temperature of at least about $+20°$ C. in order to give rise to substantial catalytic action. Methyl fluoride in combination with $BF_3$ does not give any substantial catalytic effect, at least at temperatures below $+150°$ C., and is not considered within the scope of the present invention.

The reaction may, if desired, be carried out at much higher temperatures than the minimum values above specified, and no definite maximum temperature can be given for all cases. In practice, the maximum temperature which may be employed usually will depend upon the pressure under which the available equipment is adapted to operate or upon the desired degree of purity of the 2,2,4-trimethylpentane. As a general rule, it will be desirable to operate at all times at temperatures below $+150°$ C., and usually well below this value. The preferred temperature range is from $-80°$ C. to $+20°$ C., except when ethyl fluoride is employed as the alkyl fluoride, in which case a temperature range of from $+20°$ C. to $+40°$ C. is preferred. It is noteworthy, however, that the use of the present catalytic agents permits the isobutane-isobutylene alkylation to be conducted over a much wider range of temperatures than are employed in the known processes using other catalysts.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methylbutane; n-hexyl fluoride; and similar fluoride derivatives of hexanes, heptanes, octanes or the like. As specific illustrations of secondary fluorides, the following may be mentioned: isopropyl fluoride; 2-fluoro-butane; 2-fluoro-3-methylbutane; and 2-fluoro-3,3-dimethylbutane. A few specific examples of tertiary fluorides are: t-butyl fluoride; t-amyl fluoride; 2-fluoro-2,3-dimethylbutane and other t-hexyl fluorides; t-heptyl fluorides; and 4-fluoro-2,2-4-trimethylpentane and other t-octyl fluorides. It will be understood that the specific compounds named above are given merely by way of illustration and that any alkyl fluoride (with the exception of methyl fluoride) will produce an operative catalytic combination with $BF_3$ provided the temperature is above the minimum values as set forth above. In the process of the present invention, practically no organic fluorides are formed, even at low temperatures.

In alkylation processes generally, some reactions other than straight alkylation of the isoparaffin with the olefin invariably occur along with the main alkylation reaction. This is also true of alkylations conducted according to the present process. Accordingly, the total reaction product contains hydrocarbons in addition to the $C_8$ product of the isobutane-isobutylene alkylation. Relatively small amounts of lower boiling hydrocarbons and a larger amount of heavier hydrocarbons are formed. The heavier hydrocarbons are probably formed by the polymerization of isobutylene. This reaction may be suppressed by using a large ratio of isobutane to isobutylene, say from 2 to 10, and preferably from 4 to 8, moles of isobutane per mole of isobutylene. However, these other products of the reaction are also isoparaffins of highly branched structure and are likewise useful for preparing high quality fuels. Where it is desired to obtain the 2,2,4-trimethylpentane in high concentration, it may be separated from the other hydrocarbons by distillation. On the other hand, where it is not desired to separate the 2,2,4-trimethylpentane, the total hydrocarbon product, or so much thereof as has a suitable boiling range, may be used directly for the manufacture of aviation or other motor fuels.

It is noteworthy that the total $C_8$ fraction of the reaction product of the present process contains a large proportion of 2,2,4-trimethylpentane. This is advantageous in that it readily permits the separation of the 2,2,4-trimethylpentane from the other hydrocarbon products in an unusually high state of purity. By way of contrast, heretofore known processes for alkylating isobutane with butylene generally yield the 2,2,4-trimethylpentane in admixture with substantial amounts of other hexanes, which may be of inferior antiknock value.

The process of the present invention may be performed by batch, intermittent, or continuous process. The accompanying drawing is a diagrammatic flow-sheet illustrating one manner of conducting the process in a continuous manner.

Referring to the flow-sheet, isobutane enters the system through line 1 and is passed through line 2 wherein it is mixed with isobutylene which is introduced through line 4. The hydrocarbon mixture flows through heat exchanger 5, which may be either a cooler or a heater, depending upon the temperature at which it is desired to conduct the reaction. On leaving heat exchanger 5 the hydrocarbon mixture is mixed with an alkyl fluoride, tertiary butyl fluoride being used as illustrative, which is introduced through line 6. However, both catalytic components may be introduced simultaneously but separately into the hydrocarbon mixture. Other modes of addition are discussed hereinbefore. The hydrocarbon mixture containing tertiary butyl fluoride is then passed into mixer 8 via line 9. It is apparent that if there is sufficient turbulence in line 9, mixer 8 may be omitted. The amount of alkyl fluoride may be varied, but may advantageously be within the range of 1 mole of alkyl fluoride to from 10 to 30 moles of the hydrocarbon reactants.

After the addition of the alkyl fluoride, $BF_3$ is introduced through line 10 into the tertiary butyl fluoride isobutane isobutylene mixture flowing through line 11. The amount of $BF_3$ to add is not critical, a very small amount being sufficient to establish the necessary catalytic condition.

A catalytic condition becomes established immediately upon mixing the tertiary butyl fluoride and BF₃, and alkylation starts immediately. The mixture passes through mixer 12 (which may be omitted if turbulence in the flow line is sufficient), and the alkylation proceeds rapidly under the catalytic influence of the BF₃-alkyl fluoride combination.

Upon completion of the reaction, the mixture becomes heterogeneous due to separation of a sludge from the hydrocarbon phase. The reaction mixture continuously passes from mixer 12 through line 15 and is introduced into separator 16 wherein the two phases are allowed to separate. The sludge settles to the bottom of the separator and is withdrawn through line 18. This material contains fluorine derived from the alkyl fluoride together with BF₃ in some sort of complex form. If desired, means (not shown) may be provided for recovering BF₃ from the sludge and reusing the same.

The hydrocarbon product is withdrawn from separator 16 through line 19 and is sent to distillation zone 20 for separation of the components. Distillation zone 20 will usually comprise a plurality of separate distillation steps suitable for making the separations indicated. The lowest boiling component will be any BF₃ which has remained dissolved in the hydrocarbon layer. As indicated, this BF₃ may be withdrawn through line 20 and recycled through line 21.

As shown by the drawing, the low boiling hydrocarbon constituents may be removed through lines 23 and 26, the C₈ fraction, consisting mainly of 2,2,4-trimethylpentane, through line 27, and higher boiling constituents through line 28. It has been found that the alkyl fluoride employed will be converted, at least in part, during the reaction to the corresponding hydrocarbon. Thus, if tertiary butyl fluoride is used, some isobutane will be formed. Also, if an excess of isobutane is employed, a portion thereof may remain unreacted. This isobutane is removed through line 23, and may be recycled to the process through lines 22 and 1.

The following examples illustrate specific embodiments of the present invention:

Example 1

Two runs were made in which the alkyl fluoride was isopropyl fluoride and the amount used was varied. In each run isobutane, isobutylene and isopropyl fluoride were first charged to a pressure reactor and BF₃ was then bubbled into the mixture until the pressure reached 120 lbs./sq. in. gauge. The resulting BF₃ complex layer was separated from the hydrocarbon layer, and lower boiling components were permitted to evaporate from the hydrocarbon layer through a condenser cooled by means of ice. The residue was water washed and then subjected to distillation and analysis. The following data, which include the determined percentages of specific components in the product, summarize the results:

|  | Run A | Run B |
|---|---|---|
| Reaction temperature, °C | 30 | 25 |
| Charge: | | |
| isobutane, g | 200 | 222 |
| isobutylene, g | 42 | 50 |
| isopropyl fluoride, g | 30 | 11 |
| BF₃, g. (approx.) | 12 | 14 |
| Composition of product, vol. per cent: | | |
| Lower boiling products | 40.7 | 17.7 |
| C₈ | [1] 15.5 | [2] 20.3 |
| C₉ and heavier | 43.8 | 53 |

[1] About 17% 2,2,4-trimethylpentane.
[2] About 54% 2,2,4-trimethylpentane.

The difference in results between the two runs is due mainly to the different proportions of isopropyl fluoride used. In run B where a small proportion of isopropyl fluoride was used, the product contained a relatively large percentage of 2,2,4-trimethylpentane which is the desired product of alkylating isobutane with isobutylene. Also, little isopentane was formed. In run A where a larger proportion of isopropyl fluoride was used, the proportion of 2,2,4-trimethylpentane was relatively low and the total amount of C₈ hydrocarbons was less. These results can be attributed to disproportionation and isomerization reactions induced by the increased amount of alkyl fluoride employed in run A.

Example 2

A contactor with stirrer was charged with 119 grams of a hydrocarbon mixture containing isobutane and isobutylene in ratio of 4.75 parts to 1. Twenty-seven grams of isopropyl fluoride was added and the apparatus and contents were cooled to minus 80° C. Boron trifluoride was pumped in and after one hour the reaction mass was removed and BF₃ neutralized still at minus 80° C. There resulted 53 grams of a saturated alkylate along with 12 grams of a viscous polymer. Infrared analysis showed at least 40% of the alkylate to be 2,2,4-trimethylpentane. The alkylate had a fluorine content of 0.006 weight percent.

Example 3

A contactor with stirrer was charged with 171 g. of a hydrocarbon mixture containing isobutane and isobutylene in a ratio of 4.75 to 1 and 31 g. of tertiary butyl fluoride was added. The mixture was reacted at a temperature of 20° C. by bubbling in BF₃. Upon adding 2 g. of BF₃ a very vigorous reaction took place causing a sudden large increase in pressure. The addition of 4 g. more of BF₃ caused no further reaction. 20 g. of lower layer was obtained. 69 g. of material boiling below the C₆ range was evaporated from the hydrocarbon layer, leaving 94 g. of C₆+ product. This product was saturated and had a refractive index of 1.4047. It was distilled and analyzed with the following results:

| | Vol. % of C₆+ product |
|---|---|
| C₆ | 9 |
| C₇ | 8 |
| C₈ | [1] 27 |
| C₉ and heavier | 56 |

[1] About 54% of C₈ cut was 2,2,4-trimethylpentane.

Example 4

A solution of 7 g. BF₃ dissolved in 111 g. of isobutane was charged to a pressure reactor. A mixture of 46 g. isobutane, 33 g. isobutylene and 31 g. tertiary butyl fluoride was then slowly introduced into the reactor over a period of 55 minutes while maintaining the temperature at 0° C. The layers were separated and the hydrocarbon product was evaporated to remove the lower boiling constituents. There was obtained 99 g. of low boiling material, 94 g. of a C₆+ hydrocarbon product and 31 g. of lower layer. The C₆+ product was distilled and analyzed with results as follows:

| | Vol. % of C₆+ product |
|---|---|
| C₆ | 8 |
| C₇ | 9 |
| C₈ | [1] 36 |
| C₉ and heavier | 47 |

[1] About 60% of C₈ cut was 2,2,4-trimethylpentane.

Example 5

This example was carried out in a manner similar to the previous example by employing a smaller proportion of isobutylene. The reaction was effected by introducing a mixture comprising 62 g. isobutane, 23 g. isobutylene and 39 g. tertiary butyl fluoride over a period of 45 minutes into a solution of 8 g. $BF_3$ dissolved in 117 g. isobutane. There was recovered 138 g. of lower boiling material, 81 g. of $C_5+$ hydrocarbon product and 15 g. of lower layer. Analysis of the $C_5+$ product gave the following results:

| | Vol. % of $C_5+$ product |
|---|---|
| $C_5$ | 3.0 |
| $C_6$ | 8.0 |
| $C_7$ | 7.5 |
| $C_8$ | [1] 41.5 |
| $C_9$ and heavier | 40.0 |

[1] Largely 2,2,4-trimethylpentane.

The foregoing examples are given to illustrate the process of the present invention. Under similar conditions, the use of other alkyl fluorides, as hereinbefore described, gives substantially similar results, as do the use of other operating conditions within the ranges hereinbefore described.

This application is a continuation-in-part of our copending application, Serial No. 38,167, filed July 10, 1948.

We claim:

1. Method for the preparation of 2,2,4-trimethylpentane by the instantaneous alkylation in homogeneous phase of isobutane with isobutylene which comprises reacting isobutane and isobutylene in the presence of a catalyst comprising an admixture of $BF_3$ and an alkyl fluoride having at least two carbon atoms per molecule at a temperature sufficient to effect said instantaneous homogeneous phase reaction, said temperature being in the range of from $-120°$ C. to $150°$ C.

2. Method according to claim 1 wherein a $C_8$ fraction containing a substantial proportion of 2,2,4-trimethylpentane is separated from the reaction mixture.

3. Method according to claim 1 wherein the molar ratio of isobutane to isobutylene is within the range of 2:1 to 10:1.

4. Method for the preparation of 2,2,4-trimethylpentane by the instantaneous alkylation in homogeneous phase of isobutane with isobutylene which comprises reacting isobutane and isobutylene in the presence of a catalyst comprising an admixture of $BF_3$ and a tertiary alkyl fluoride at a temperature sufficient to effect said instantaneous homogeneous phase reaction, said temperature being in the range of from $-120°$ C. to $150°$ C.

5. Method according to claim 4 wherein the alkyl fluoride is tertiary butyl fluoride.

6. Method for the preparation of 2,2,4-trimethylpentane by the instantaneous alkylation in homogeneous phase of isobutane with isobutylene which comprises reacting isobutane and isobutylene in the presence of a catalyst comprising an admixture of $BF_3$ and a secondary alkyl fluoride at a temperature sufficient to effect said instantaneous homogeneous phase reaction, said temperature being in the range of from $-90°$ C. to $150°$ C.

7. Method according to claim 6 wherein the alkyl fluoride is isopropyl fluoride.

8. Method for the preparation of 2,2,4-trimethylpentane by the instantaneous alkylation in homogeneous phase of isobutane with isobutylene which comprises reacting isobutane and isobutylene in the presence of a catalyst comprising an admixture of $BF_3$ and a primary alkyl fluoride having at least 3 carbon atoms per molecule at a temperature sufficient to effect said instantaneous homogeneous phase reaction, said temperature being in the range of from $-10°$ C. to $150°$ C.

9. Method according to claim 8 wherein the alkyl fluoride is 1-fluoro-3,3-dimethylbutane.

10. Method for the preparation of 2,2,4-trimethylpentane by the instantaneous alkylation in homogeneous phase of isobutane with isobutylene which comprises reacting isobutane and isobutylene in the presence of a catalyst comprising an admixture of $BF_3$ and ethyl fluoride at a temperature sufficient to effect said instantaneous homogeneous phase reaction, said temperature being in the range of from $20°$ C. to $150°$ C.

ROBERT M. KENNEDY.
ABRAHAM SCHNEIDER.

REFERENCES CITED

The following references are of record in the file of this patent:

UNITED STATES PATENTS

| Number | Name | Date |
|---|---|---|
| 2,304,290 | Van Peski | Dec. 8, 1942 |
| 2,413,384 | Schmerling | Dec. 31, 1946 |